United States Patent
Böbel et al.

(10) Patent No.: US 6,240,652 B1
(45) Date of Patent: Jun. 5, 2001

(54) OPTOELECTRONICAL POSITION DETECTION

(75) Inventors: Ralf Böbel, Dortmund; Frank Bläsing, Werl, both of (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 0 days.

(21) Appl. No.: 09/353,472

(22) Filed: Jul. 13, 1999

(30) Foreign Application Priority Data

Aug. 8, 1998 (DE) .............................................. 198 35 972

(51) Int. Cl.$^7$ ...................................................... G11C 11/42
(52) U.S. Cl. ........................ 33/707; 250/231.14; 33/1 PT
(58) Field of Search ................................. 33/1 N, 1 PT, 33/534, DIG. 3, 762, 763, 286, 706, 707; 250/231.14, 231.18

(56) References Cited

U.S. PATENT DOCUMENTS

| | | | | |
|---|---|---|---|---|
| 3,116,886 | * | 1/1964 | Kuehne ................................. | 33/1 PT |
| 3,762,819 | * | 10/1973 | Myer ...................................... | 33/1 N |
| 4,318,225 | * | 3/1982 | Jenkinson ............................. | 33/1 PT |
| 4,388,758 | * | 6/1983 | Ernst et al. ........................... | 33/1 PT |
| 4,466,189 | * | 8/1984 | Tobin, Jr. .............................. | 33/1 PT |
| 4,536,650 | * | 8/1985 | Carena et al. .................... | 250/231.14 |
| 4,953,933 | * | 9/1990 | Asmar ............................. | 250/231.18 |
| 5,060,592 | * | 10/1991 | Stock ..................................... | 33/1 N |

(List continued on next page.)

FOREIGN PATENT DOCUMENTS

| | | | | |
|---|---|---|---|---|
| 2035580 | * | 6/1980 | (DE) ..................................... | 33/1 N |
| 86 21 057 U1 | | 7/1986 | (DE) . | |
| 36 41 288 C1 | | 6/1988 | (DE) . | |
| 40 22 837 A1 | | 1/1992 | (DE) . | |
| 4129232A1 | * | 3/1993 | (DE) ..................................... | 33/1 PT |
| 0104812 | * | 6/1982 | (JP) ........................................ | 33/1 N |
| 0104815 | * | 6/1982 | (JP) ........................................ | 33/1 N |
| 0116214 | * | 7/1982 | (JP) ........................................ | 33/1 N |
| 0000607 | * | 1/1984 | (JP) ........................................ | 33/1 N |
| 0166816 | * | 8/1985 | (JP) ........................................ | 33/1 N |
| 0026810 | * | 2/1986 | (JP) ........................................ | 33/1 N |
| 402272312A | * | 11/1990 | (JP) ........................................ | 33/1 N |

*Primary Examiner*—Diego Gutierrez
*Assistant Examiner*—Madeline Gonzalez
(74) *Attorney, Agent, or Firm*—Brooks & Kushman P.C.

(57) ABSTRACT

An optoelectronic position detecting device for determining the absolute path or angle of two bodies which are moved relative to each other, comprising a light source 3, a transmitter element 2 which is partially exposed to light by the light source 3 and comprises a coding and which transmitter element 2 is coupled to the movement of the movable body, wherein the coding is provided in the form of a scanning trace 6, which is produced by virtue of the exposure to light, and a reference trace 7, and comprising a photosensitive line sensor 4 which is disposed in a fixed manner with respect to the transmitter element 2 for the purpose of scanning the code traces 6, 7 of the transmitter element 2, which output signals of the line sensor 4 influence an electronic evalutating unit for the purpose of determining the absolute path or angle, is determined by virtue of the fact that the transmitter element 2 is formed as a light-guiding body, into whose edge peripheral surface are coupled the light beams emitted by the light source 3, which transmitter element 2 comprises reflection surfaces $R_1$, $R_2$ for the purpose of forming the code traces, on which reflection surfaces the coupled-in light beams of the coding are correspondingly reflected out of the transmitter element 2 and towards the photosensitive surface of the line sensor 4.

It is particularly expedient to use this type of optoelectronic position detecting device as a steering angle sensor for the purpose of determining the angle position of the steering wheel of a motor vehicle.

6 Claims, 2 Drawing Sheets

U.S. PATENT DOCUMENTS

| | | | |
|---|---|---|---|
| 5,218,769 | * | 6/1993 | Tranchon ................................ 33/1 N |
| 5,301,434 | * | 4/1994 | Imaizumi ................................ 33/1 N |
| 5,399,981 | * | 3/1995 | Vermesse ............................. 33/1 PT |
| 5,479,010 | * | 12/1995 | Shimomura et al. ........... 250/231.18 |
| 5,500,524 | * | 3/1996 | Rando ..................................... 33/286 |
| 5,746,005 | * | 5/1998 | Steinberg ............................. 33/1 PT |
| 5,855,072 | * | 1/1999 | Nakaho ................................ 33/1 PT |

* cited by examiner

OPTOELECTRONICAL POSITION DETECTION

TECHNICAL FIELD

The present invention relates to optoelectronic position detection devices for detecting the position of a movable body and, more particularly, to an optoelectronic position detection device for detecting the displacement between a movable body relative to a fixed body.

BACKGROUND ART

Optoelectronic position detecting devices detect the absolute position and movement of specific machine parts with respect to each other. For example, optoelectronic position detecting devices detect robot movements. Optoelectronic position detecting devices are used in the automotive industry, for example, for detecting steering angles. The steering angle and the steering angle lock in motor vehicles is required by a driving dynamics control system. In addition to the steering angle values, the driving dynamics control system obtains further measurement data such as wheel rotational speed and the rotation of the motor vehicle about its vertical axis. The driving dynamics control system evaluates the absolute steering angle lock and the steering speed with other detected data for generating control signals. The control signals control actuators such as brakes and are used for engine management.

DE 40 22 837 A1 discloses an optoelectronic steering angle sensor. The steering angle sensor includes a light source and a line sensor arranged in parallel and spaced apart from each other to form a gap. A round encoder disc engages into the gap and is non-rotatable connected to the steering spindle. A code transmitter is formed as a light slit disc having a code trace. The code trace is a spiral which increases in size from the inside outwards. A CCD-sensor line is the line sensor. Because of the exposure of the image points of the line sensor in the case of a specific steering lock, it is possible to obtain information regarding the steering angle lock.

Steering angle sensor systems are installed in the region of the steering spindle of the motor vehicle. The installation space available in this region for installing steering angle sensor systems is limited. The available installation space is particularly limited in the axial direction of the steering spindle. The steering angle sensor of DE 40 22 837 A1 does not satisfy the demands of the minimum installation space. A line-source-LED is located as the light source on one side of the encoder disc on a plate and the sensor line is located on another plate on the other side of the encoder disc. The installation space is determined by the structure of the electronic components on the two plates and the width of the gap provided between these two electronic elements. The gap must be sufficiently large to ensure that the encoder disc can be rotated therein with a sufficient degree of axial play.

DE 36 41 288 C1 discloses an optoelectronic position detecting device requiring a smaller installation space than the required installation space of the device disclosed in DE 40 22 837 A1. The light source and the sensors of this device are located on the same side of the encoder disc. The encoder disc is essentially impervious to light on its side pointing towards the light source and the sensor elements. An annular light coupling window is exposed only in the region of the rotational center of the encoder disc. Accordingly, windows are provided in the light-impervious layer. The windows decouple the light from the encoder disc.

DE 36 41 288 C1 discloses another embodiment of the optoelectronic position detection device in which light is coupled from the side over the peripheral surface of the encoder disc. However, the problem associated with such an arrangement is that the encoder disc can only have a single trace.

DE 86 21 057 U1 discloses an optoelectronic angle measuring device requiring a small amount of installation space. The required amount of installation space is small because the encoder disc includes an annular recess into which a fixed light source protrudes. The light emitted by the light source is coupled by the annular recess into the encoder disc. The light is then reflected on a curved, metallized peripheral surface towards the planar base surface of the encoder disc such that the coding provided on this side of the encoder disc is exposed to light. However, this optoelectronic position detecting device has the problem that it is not possible to expose a plurality of code traces to a sufficient quantity of light.

DISCLOSURE OF INVENTION

Accordingly, it is an object of the present invention to provide an optoelectronic position detecting device requiring minimal installation space while enabling a plurality of code traces to be exposed to light simultaneously.

In carrying out the above object and other objects, the present invention provides an optoelectronic position detecting device for determining the absolute position of a movable body that is rotatable with respect to a fixed body. The device includes a light source for providing light. A transmitter disc is coupled to the movable body to move in correspondence therewith. The transmitter disc has a scanning code trace on one surface and a reference code trace on the opposite surface. The scanning code trace spirally extends around the one surface of the transmitter disc and the reference code trace circularly extends around the opposite surface of the transmitter disc. The transmitter disc has a peripheral connecting the opposing surfaces for receiving light from the light source. The scanning code trace and the reference code trace have respective reflective surfaces for reflecting respective light beams from the light received from the light source. A photosensitive line sensor is fixed with respect to the transmitter disc for receiving the respective reflected light beams from the scanning code trace and the reference code trace. The photosensitive line sensor generates output signals in response to the respective reflected light beams from the scanning code trace and the reference code trace. The output signals are indicative of the position of the movable body with respect to the fixed body as the movable body rotates.

The optoelectronic position detecting device enjoys the advantage of the light source not lying directly opposite to the line sensor. Consequently, the required installation space is minimal because the light beams for forming the light traces of the scanning trace and the reference trace are laterally transmitted into the transmitter element. The reflection surfaces of the transmitter element then reflect the light beams towards the photosensitive surface of the line sensor. The respective reflection surfaces represent the two code traces, the scanning trace and the reference trace. To enable this process, the transmitter element is formed as a transparent light-guiding body.

Furthermore, in addition to the minimal required installation space, the optoelectronic position detecting device enjoys the advantage that it is unnecessary to make adjustments between the light source and the line sensor. Also, the light source and the line sensor can be attached to the same printed circuit board.

The reflection surfaces representing the code traces take the form of notches extending into the surface of the transmitter element. Because the notches engage into the surface of the transmitter element at different depths, adjacent code traces on the surface of a line sensor can be represented. The encoder disc has a sufficient thickness such that the desired number of notches having different depths can be provided. The notches, i.e., reflection surfaces, are disposed at an angle with respect to the plane of the transmitter element such that the reflected light beams expose the surface of the line sensor. In so doing, the notch representing the scanning trace is in one surface of the transmitter element and the notch representing the reference trace is in the other surface of the transmitter element.

In a preferred embodiment, the lateral edge of the transmitter element, into which the light beams are coupled, is curved spherically outwards to act as a lens. The has the advantage that the diverging light beams emitted by the dot-shaped light source are rendered parallel when transmitted into the transmitter element. Thus, the reflection surfaces reflect onto the line sensor in parallel. The imaging sharpness of the two code traces on the photosensitive surface of the line sensor is correspondingly high.

In an alternative embodiment, the light source is a light emitting diode (LED) disposed on the same printed circuit board on which the line sensor is also disposed and electrically contacted. The LED transmits light into the plane of the transmitter disc by using a light-guiding body formed as a type of prism. The outer peripheral surface of the transmitter disc is a cylindrical peripheral surface and is thus straight and the light-guiding body surface is curved spherically as a lens. A plurality of light beams whose vertical extension is greater than the thickness of the transmitter disc illuminate the transmitter disc. This embodiment enables particular tolerances of the transmitter disc to be counteracted in the vertical direction without these tolerances having a disadvantageous effect on the imaging of the light traces on the photosensitive surface of the line sensor.

The surface on the decoupling side of the light-guiding body is convex for reflecting the light beams. Either a reflection surface or the photosensitive surface of the line sensor can lie in the focal point of this reflected beam bundle.

Because of the small installation space required by the optoelectronic position detecting device in accordance with the present invention and the problem-free assembly of this type of device, the device is preferably used as a steering angle sensor for determining the angle position of the steering wheel of a motor vehicle. In this case, a round encoder disc is used as the transmitter element and is coupled to the rotational movement of the steering spindle. The light source and the line sensor are fixed, for example, on the steering column tube module.

The optoelectronic position detecting device in accordance with the present invention can also be used for detecting the switch position of an electrical switch. For this purpose, it is also possible to generate a contact-free switch signal.

BEST MODE FOR CARRYING OUT THE INVENTION

Figure 1:
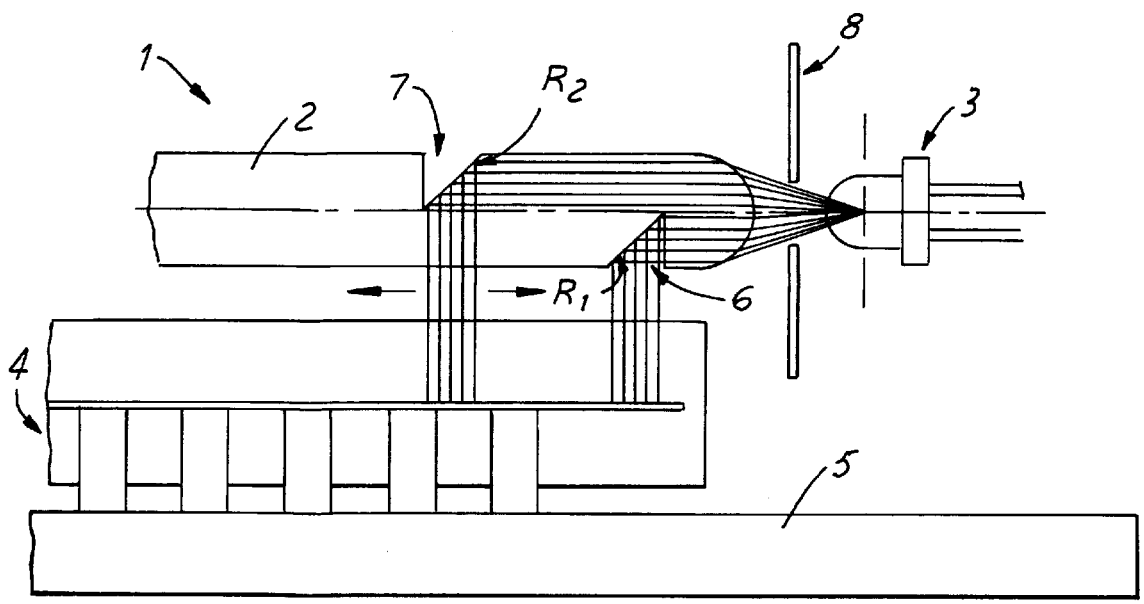
FIG. 1 illustrates a schematic partial lateral view of an optoelectronic position detecting device used as a steering angle sensor in accordance with the present invention.
Figure 2:
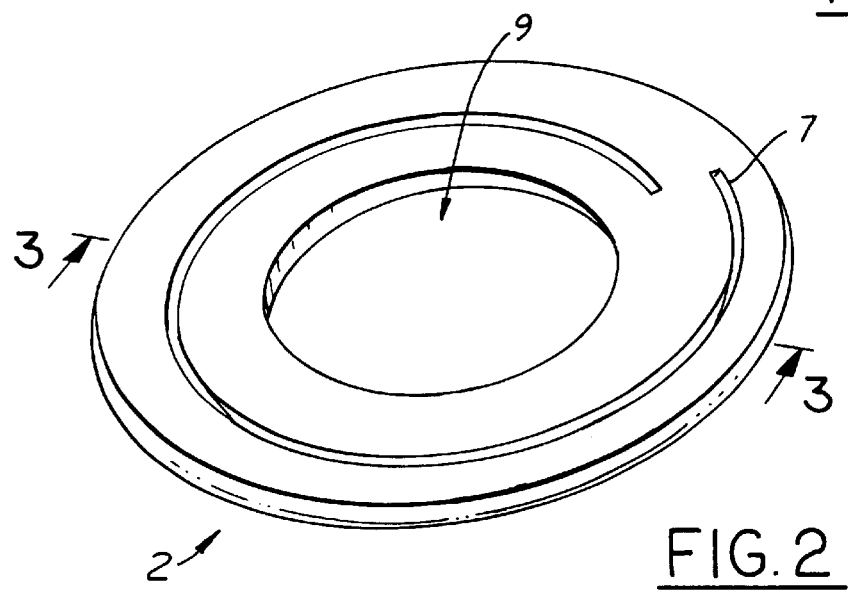
FIG. 2 illustrates a perspective view of the encoder disc used in FIG. 1 for the steering angle sensor.
Figure 3:
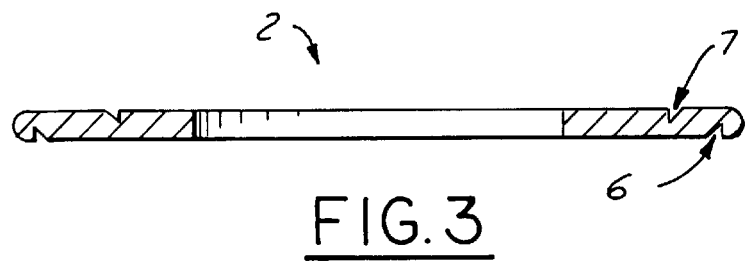
FIG. 3 illustrates a sectional view of the encoder disc in FIG. 2 along the line 3—3 of FIG. 2.

An optoelectronic position detecting device for detecting steering angles in accordance with a preferred embodiment of the present invention is shown in FIGS. 1–3. The optoelectronic position detecting device includes an angle sensor 1 having a transmitter disc 2, a light source 3, and a photosensitive, linear PDA 4 (Photo-Diode-Array). Transmitter disc 2 is formed as a light-guiding body. Light source 3 is disposed radially with respect to transmitter disc 2. PDA 4 is disposed below transmitter disc 2 in a plane parallel therewith. A printed circuit board 5 supports PDA 4.

As illustrated in FIG. 2, transmitter disc 2 is an annular, circular disc. Only an outer ring portion of transmitter disc 2 is illustrated in FIG. 1. For representing a coding, an outer notch 6 for imaging a reference trace is incorporated into the lower side of transmitter disc 2. An inner notch 7 for imaging a scanning trace is incorporated in the upper side of transmitter disc 2. Notches 6, 7 are configured to each have a wall forming a respective reflection surface $R_1$, $R_2$.

The angle position of reflection surfaces $R_1$, $R_2$ is inclined with respect to the plane of transmitter disc 2 so that the light beams which impinge thereon are totally reflected towards the photosensitive surface of PDA 4. The respective other wall of notches 6, 7 is at a right angle to the plane of transmitter disc 2.

In the preferred embodiment illustrated in FIG. 1, light source 3 includes a single LED. LED 3 is disposed in the plane of transmitter disc 2. The light beams emitted by LED 3 pass through an aperture 8 before they are coupled into transmitter disc 2. Aperture 8 prevents LED 3 from directly exposing PDA 4 to light. The light beams passing through aperture 8 are coupled on the edge into the spherically curved peripheral surface of transmitter disc 2. The diverging light beams from light source 3 are focused to be parallel during this coupling-in process.

As illustrated in FIG. 2, notch 7, the scanning trace, is a spiral winding extending over 360° and increasing in size from the inside outwards. The central open portion of transmitter disc 2 is formed as a steering spindle receiving arrangement 9. Steering spindle receiving arrangement 9 receives the steering spindle such that transmitter disc 2 is fixed with respect to the steering spindle and moves therewith. As evident in the cross-sectional view illustrated in FIG. 3, notch 6, the reference trace, is a circular-ring shaped notch in the outer edge region of transmitter disc 2.

The light beams reflected by reflection surface $R_1$ of reference trace 6 expose essentially the same image points of PDA 4 as the steering spindle and transmitter disc 2 rotate. In contrast, the light trace reflected by reflection surface $R_2$ of scanning trace 7 moves longitudinally in correspondence to the position of transmitter disc 2 as transmitter disc 2 rotates. The light trace reflected by reflection surface $R_2$ moves longitudinally because of the spiral-shape formation of reflection surface $R_2$. The reflected light trace from reflection surface $R_2$ moves in the longitudinal direction of PDA 4 as indicated by the arrows shown in FIG. 1.

Different rotational angle positions of transmitter disc 2 cause different image points of PDA 4 to be exposed with light reflected by reflection surface $R_2$. To compensate for radial tolerances, the steering angle is determined in a secondary manner by determining the distance between the image points of PDA 4 exposed with light reflected by reflection surface $R_1$ of reference trace 6 and the image points of the PDA exposed with light reflected by reflection surface $R_2$ of scanning trace 7.

It is evident from the description of the preferred embodiment that the dimensions of the space required for installing an optoelectronic position detecting device in accordance with the present invention is minimal. This is because with respect to transmitter element 2 for scanning the code traces, electronic components only have to be positioned on one of its sides. Thus, it is possible to couple transmitter disc 2 directly to existing modules in a steering column-steering wheel unit of a motor vehicle. Different components can be used as transmitter disc 2. For example, the rotor disc of a flat spiral spring cartridge for producing an electrical connection between a steering column tube module and the steering wheel could be used.

Because transmitter element 2 is laterally exposed to light and the light beams are coupled correspondingly into the light-guiding transmitter disc, only a dot-shaped light source, i.e a single LED, is required as the light source. In contrast, with prior art optoelectronic position detecting devices it was necessary to expose the entire width of the code traces to light using an oblong light source such as a line-source-LED.

Figure 4:
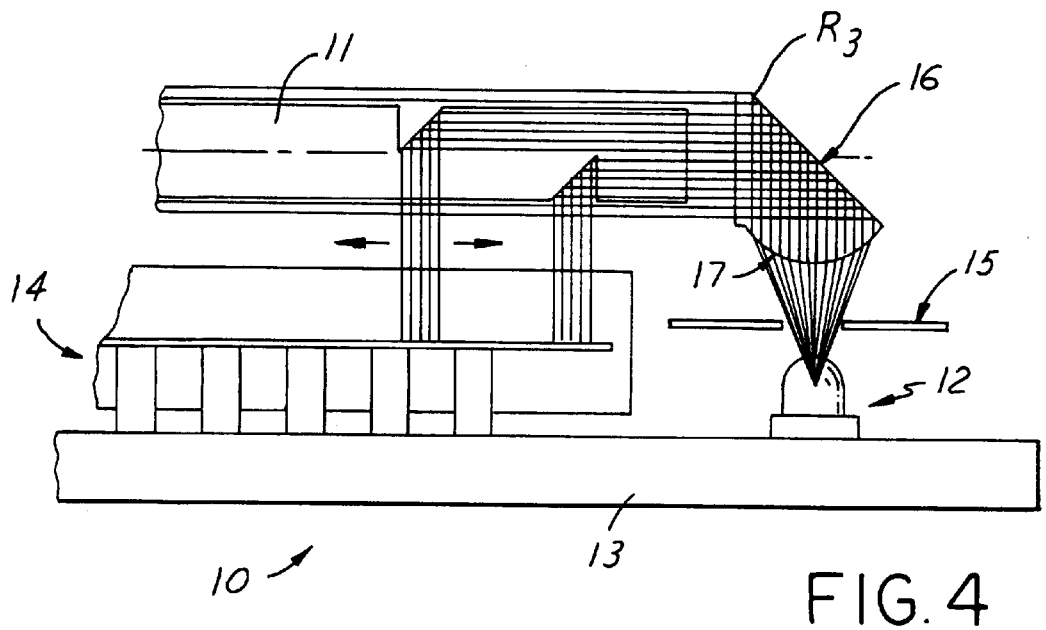
FIG. 4 illustrates a schematic partial lateral view of an optoelectronic position detecting device used as a steering angle sensor in accordance with an alternative embodiment of the present invention.
Figure 5:
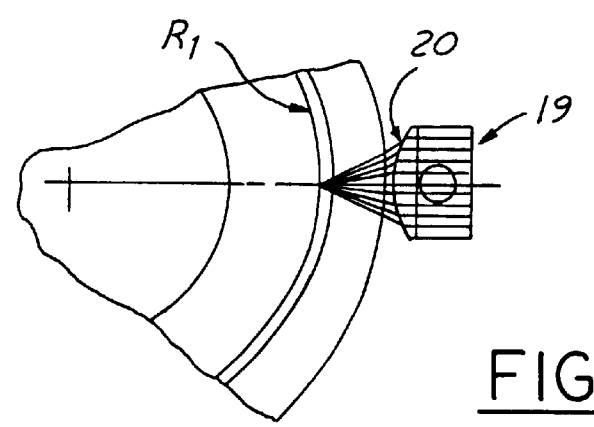
FIG. 5 illustrates a schematic plan view of a light-guiding body for use in the steering angle sensor illustrated in FIG. 4.
Figure 6:
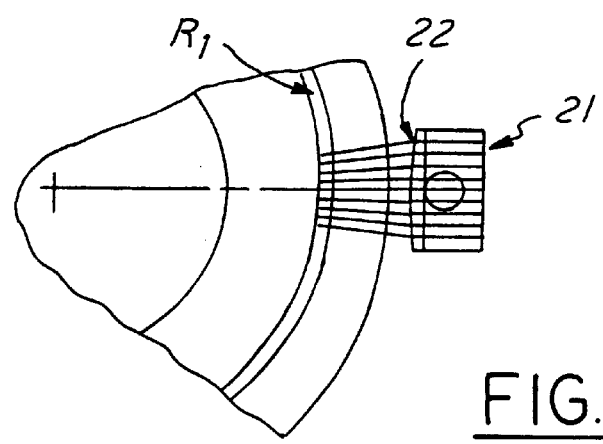
FIG. 6 illustrates a schematic plan view of another light-guiding body for use in the steering angle sensor illustrated in FIG. 4.

FIGS. 4–6 illustrate a steering angle sensor 10 in accordance with an alternative embodiment of the present invention. The essential features of steering angle sensor 10 correspond to those of steering angle sensor 1 described in FIGS. 1–3. In contrast to steering angle sensor 1, the circumferential peripheral surface of transmitter disc 11 of steering angle sensor 10 is cylindrical. LED 12 is disposed on the same printed circuit board 13 as PDA 14. An aperture 15 defines the exit angle of the light beams emitted by LED 12. To couple these light beams into transmitter disc 11, a light-guiding body 16 is provided in the form of a prism. The lower coupling-in side surface 17 of light-guiding body 16 is spherically curved as a lens. The spherical curvature causes the divergent light beams emitted by LED 12 to become parallel.

A reflection surface $R_3$ in light-guiding body 16 reflects the light beams coupled into the plane of transmitter disc 11. The parallel light beams exit light-guiding body 16 and are coupled by the smooth cylindrical surface of transmitter disc 11 into the same. The size of decoupling surface 18 of light-guiding body 16 and/or the decoupled beam bundle is/are formed such that the vertical extension shown in FIG. 4 is greater than the actual thickness of transmitter disc 11. Thus, the parallel light beams are properly coupled into transmitter disc 11 even if the transmitter disc has tolerances in the vertical direction when rotated.

Decoupling surface 18 of light-guiding body 16 is planar. FIG. 5 illustrates a plan view of another light-guiding body 19. Light-guiding body 19 has a decoupling surface 20. Decoupling surface has a convex curvature. The convex curvature is formed such that reflection surface $R_1$ of reference trace 6 lies in the focal point. FIG. 6 illustrates another light-guiding body 21. Light-guiding body 21 has a convex curvature decoupling surface 22. Decoupling surface 22 has a convex curvature for bundling the light beams on the photosensitive surface of PDA 4.

Thus it is apparent that there has been provided in accordance with the present invention, an optoelectronic position detecting device, that fully satisfies the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An optoelectronic position detecting device for determining the position of a movable body that is rotatable with respect to a fixed body, the device comprising:

a light source for providing light;

a light guiding transmitter disc coupled to the movable body to move in correspondence therewith, the transmitter disc disposed laterally with respect to the light source, the transmitter disc having a scanning code trace on one surface and a reference code trace on the opposite surface, the scanning code trace spirally extending around the one surface of the transmitter disc, the reference code trace circularly extending around the opposite surface of the transmitter disc, the transmitter disc having a periphery connecting the opposing surfaces, the periphery laterally receiving light from the light source, the scanning code trace and the reference code trace having respective reflective notches extending into the opposed surfaces for reflecting respective parallel light beams from the light received from the light source, the scanning code trace and the reference code trace reflecting the light beams perpendicular to the light laterally received by the periphery from the light source; and a photosensitive line sensor disposed perpendicular to the light source and disposed beneath the transmitter disc in a plane parallel therewith and fixed with respect to the transmitter disc for receiving the respective reflected light beams from the scanning code trace and the reference code trace, wherein the photosensitive line sensor generates output signals in response to the respective reflected light beams from the scanning code trace and the reference code trace, the output signals being indicative of the position of the movable body with respect to the fixed body as the movable body rotates.

2. The position detecting device of claim 1 wherein:
   the periphery of the transmitter disc is spherically curved outward for focusing the light received from the light source.

3. The position detecting device of claim 1 wherein:
   the periphery of the transmitter disc is cylindrical.

4. The position detecting device of claim 1 further comprising:
   a printed circuit board, wherein the light source and the photosensitive line sensor are attached to the printed circuit board.

5. The position detecting device of claim 1 further comprising:
   a prism for receiving light from the light source and then transmitting the light into the peripheral of the transmitter disc.

6. A steering angle sensor for determining the position of a steering wheel connected to a rotatable steering spindle in a motor vehicle, the steering angle sensor comprising:

a light source for providing light;

a light guiding transmitter disc coupled to the steering spindle to move in correspondence therewith as the steering wheel rotates, the transmitter disc disposed laterally with respect to the light source, the transmitter disc having a scanning code trace on one surface and a reference code trace on the opposite surface, the scanning code trace spirally extending around the one surface of the transmitter disc and the reference code trace circularly extending around the opposite surface of the transmitter disc, the transmitter disc having a periphery connecting the opposing surfaces, the periphery laterally receiving light from the light source, the scanning code trace and the reference code trace having respective reflective notches extending into the opposed surfaces for reflecting respective parallel light beams from the light received from the light source, the scanning code trace and the reference code trace reflecting the light beams perpendicular to the light laterally received by the periphery from the light source; and a photosensitive line sensor disposed perpendicular to the light source and disposed beneath the transmitter disc in a plane parallel therewith and fixed with respect to the transmitter disc for receiving the respective reflected light beams from the scanning code trace and the reference code trace, wherein the photosensitive line sensor generates output signals in response to the respective reflected light beams from the scanning code trace and the reference code trace, the output signals being indicative of the position of the steering wheel as the steering wheel rotates.

* * * * *